Feb. 20, 1968 H. B. CUMMINGS Re. 26,345

TILE SETTER

Original Filed Jan. 22, 1962

INVENTOR.
HOWARD B. CUMMINGS
BY
Eby, Fearne & Gordon
ATTORNEYS

United States Patent Office

Re. 26,345
Reissued Feb. 20, 1968

26,345
TILE SETTER

Howard B. Cummings, New Castle, Pa., assignor, by mesne assignments, to Shenango Ceramics, Inc., New Castle, Pa., a corporation of Delaware Original No. 3,181,223, dated May 4, 1965, Ser. No. 170,530, Jan. 22, 1962. Application for reissue May 1, 1967, Ser. No. 641,731
11 Claims. (Cl. 264—58)

Matter enclosed in heavy brackets [ ] appears in the original patent but forms no part of this reissue specification; matter printed in italics indicates the additions made by reissue.

*ABSTRACT OF THE DISCLOSURE*

*Setter and method for keeping flat tile straight and free of soiling during firing of glaze by supporting tile on cantilever supported opposed sets of shelves whose outer edges provide parallel horizontal bearing surfaces so that a tendency of unsupported tiles to sag in the center during fire is counterbalanced by overhanging margins of the tiles. Under surfaces of shelves are sloped so that accumulations of volatilized glaze not ventilated away or carried out by condensation on undersides of tiles stacked in the setter will run to the sides and not drop on tiles. Edges of shelves are but slightly raised above upper shelf surfaces which thus act as limits for the sagging of the tile margins during fire.*

This invention relates to improvements in kiln furniture for the firing of the tile and, more particularly, to setters for the firing of glazed flat ceramic tiles for walls, flooring, or the like.

At the stage of manufacture of ceramic tiles at which setters made according to this invention are employed, the tile is usually in the condition of green ware comprising a body of dry unfired clay of relatively thin cross-section and conventional polygonal shape (usually square or otherwise rectangular). The relatively smoother upper surface of the clay body carries a dried coating of frit in which are the necessary fluxes, opacifiers, and colors to be fused into an adherent surface glaze when the clay body is fired to the semi-vitreous condition of the manufactured tile.

With the green tile prepared for firing as described above, it has heretofore been the preferred practice in the art to support the tile in shallow setter trays of a suitable refractory material. These trays have flat, imperforate bottoms and sides extending above the tile-supporting surface of the bottom a distance sufficient to provide clearance between the glazed surface of a tile placed in one tray and the underside of a tray above it. With one or more tiles (depending upon the size of the tiles and trays) placed in each tray, a number of trays are stacked into a bung with a cover plate over the top tray of the bung. The trays making up a bung are usually cemented together at the parting line between the sides of one tray and the bottom of the tray above to prevent the shifting of the trays with respect to each other as the bungs are loaded on the cars on which the bungs are conveyed in and out of the kiln for firing. The sides of the trays are provided with openings to permit the movement of gases in and out of the trays, but the size of the openings must be relatively limited to provide the necessary strength for supporting other trays in the bung as well as the bungs which may be loaded on top of the bottom bungs when loading a kiln car. The function of the flat bottom of the trays in a bung is to provide a flat supporting surface upon which each tile will rest so that the tile will not warp as it is brought to its maximum firing temperature; also, the bottom of one tray (plus the cover plate in a bung) serves to shield from dirt and contamination the molten glaze which fuses together and to the body of the tile as it is being fired. After the tile is fired and the bungs cooled, the trays are removed, broken apart to remove the tile, and then reused.

A problem of the above-described tray-style of setter is that in repeated usage, the trays themselves tend to warp so that the trays will not support and produce straight tile, in which case, they must be discarded. The tray setters are also subject to considerable cracking and breakage in the stacking, breaking apart, and other handling of the trays making up the bungs. Still another fault of the above-described tray setters is that, in repeated re-use, glaze will volatilize and condense on the underside of the tray above it. In time, this volatilized glaze may accumulate to the point where, at the maximum firing temperature, it drops onto the tile below it or, in reaching this temperature and because the rate of thermal expansion of the glaze is different from that of the refractory from which the trays are made, the accumulated glaze spalls off the underside of the tray and falls onto the glaze of the tile beneath; in either case, the tile is spoiled and must be discarded. Also, a considerable amount of labor is involved in cementing up the bungs and, because the so cemented bungs are seldom of precisely equal height, time-consuming care must be used in loading layers of bungs upon another to provide a stable load in the kiln cars.

In addition to the above faults and expenses of the system of firing tile in setter trays which have heretofore been considered inherent and unavoidable, a less appreciated but nonetheless serious element of cost is that the trays themselves are more massive than the mass of the tile being produced in order to provide the required strength and stability of the bungs. As a consequence, a major portion of the heat produced in a tile kiln, as well as its volumetric capacity is taken up by the setters, rather than by the tiles to be fired.

It is the object of this invention to provide a setter for firing tile which not only produces straight tile but eliminates many of the above faults and disadvantages of the tray setters as above described. That is, the cost, weight, and mass of refractory material per tile being fired are greatly reduced and the capacity of a kiln greatly increased, both volumetrically in that a greater number of tiles may be carried by a kiln car (and in the rate of production in that the tiles may be fired faster because less time is required to bring a lesser mass of refractory material up to temperature). Also, the labor involved in cementing the trays into a bung is eliminated and the care and time required in loading the kiln cars or other conveyor means is minimized.

A still further advantage is that, due to improvement of ventilation of the tiles as fired, more uniform color can be developed among the tiles of a lot being fired and a better color match may be obtained between tiles fired in different lots. And, due to the configuration of the tile supports, the spoilage of glaze from accumulations of volatilized glaze on the setter is substantially eliminated.

Other and further objects and advantages of this invention will be apparent from the following specification, claims, and drawings, in which:

Figure 1:
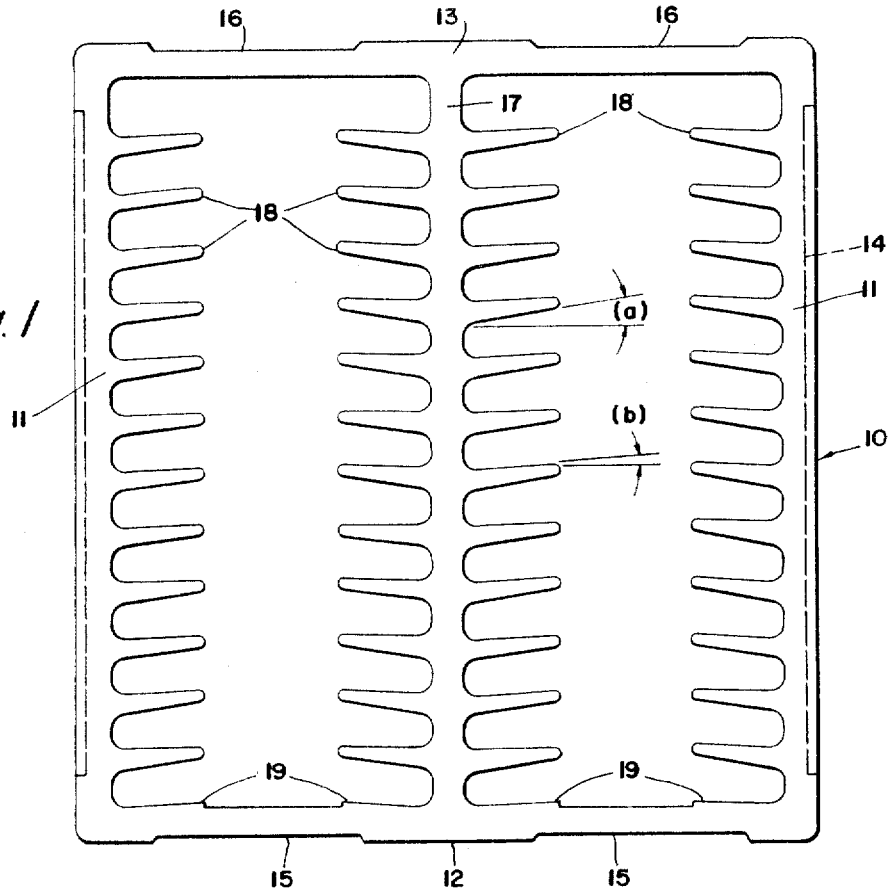
FIG. 1 is a front elevational view of a two-cell tile setter made according to this invention.
Figure 2:
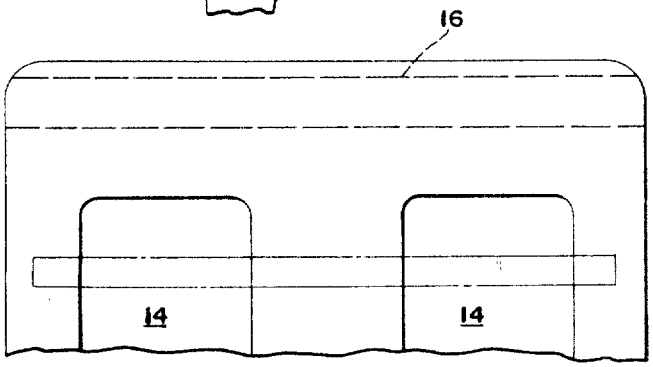
FIG. 2 is a fragmentary side elevation of the setter shown in FIG. 1, showing in phantom the location of a tile supported on the uppermost of an opposed pair of cantilever shelves.

As shown in FIGS. 1 and 2, a tile setter 10 made according to this invention comprises a box having a pair of side walls 11 supporting a bottom 12 and top 13, leaving an open front and back. To minimize the mass of the refractory material making up the setter 10 without appreciably reducing the strength and stiffness of them, the side walls 11 are provided with suitable vertically extending recesses 14 and the bottom 12 and the top 13 are provided with horizontally extending recesses 15 and 16, respectively. Depending upon the size of the tile to be fired, the modular dimensions of the setter with respect to the dimensions of the kiln car or conveyor on which it is to be placed, and the weight of the setter, when loaded with tile, that is convenient to handle, the top, bottom, and sides of the setter may define a single open-ended cell or a plurality of cells. In this particular embodiment shown, the setter is divided into two cells by a vertical partition 17.

Figure 3:
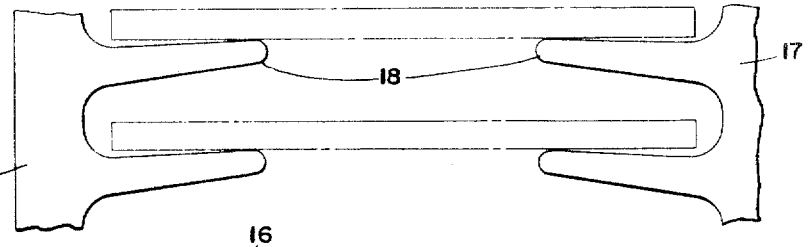
FIG. 3 is a detailed elevation taken from FIG. 1 and showing in phantom the location and support of tiles on the cantilevers.

In each cell the sides thereof are provided with a plurality of opposed horizontal cantilever shelves 18 extending inwardly toward each other and slightly upwardly from the side walls with which they are integral. Referring to FIG 3, the side wall 10 and partition 17 are spaced from each other a horizontal distance sufficient to permit a green tile, with the unfired glaze uppermost, to be inserted into the cell with sufficient clearance to permit easy loading and unloading of a tile onto the opposed shelves. Each shelf 18 extends into the cell a distance sufficient to locate its outer and uppermost edge in a position to support a tile along a line midway between the center and the adjacent edge of the tile. It is to be noted that each shelf is slightly thicker at its root where it is integral with a side wall or partition than it is at its outer end, and that the angle (a) at which the underside of a shelf extends with respect to its supporting wall is slightly greater than the angle (b) at which the upper surface extends. This is to provide structural strength with a minimum of mass of refractory while presenting the upper edge of the shelf as a line of support. It is also to be noted that the opposed pair of shelves are spaced from each other a distance to provide a spacing between tiles supported thereon at least twice the thickness of the tiles.

The bottom 10 is provided with horizontal ridges 19 which afford tile-supporting lines parallel to and vertically aligned with the lines of support provided by the outer upper edges of the shelves 18. The bearing surfaces of the top and bottom as defined by the recesses 15 and 16 are preferably parallel and provide an over-all height equal to the height of other setters to be loaded as a layer on a kiln car.

With the setter loaded with tiles as indicated in FIG. 3, it is placed with similar setters on a kiln car or conveyor and the tiles are then fired. In essence, the operation and advantage of this invention flow from a utilization of the discovery that, contrary to prior practice with tray setters and the like, it is not necessary to support a tile having a typical clay body and thickness during its fire throughout the entire undersurface or substantially so. Rather, the tile will remain straight if it is simply supported along a line approximately midway between its edge and center so that the weight of the portion of tile which overhangs one side of the line of support will approximately balance the weight of the portion which overhangs the other side of the line of support, as shown in FIG. 3.

By the above construction, a substantial portion of the mass of refractory material heretofore taken up by the bottom of tray setters is eliminated and a setter made according to this invention is equivalent to a bung of tray setters, but of substantially less height than a bung carrying an equal number of tiles. At the same time, the glaze on the tiles is shielded by the tile above it, rather than by the bottom of a superimposed tray in a bung of tray setters. There is less build-up of volatilized glaze to cause spoilage by dropping or spoiling because much of the glaze volatilized from the surface of one tile will deposit on the underside of the shielding tile above it and, thereby, be removed when the tiles are fired and removed from the setter. Also, due to the greater ventilation permitted by the open ends of the setter, much volatilized glaze that might accumulate in conventional setters may be exhausted out of the setters by the flow of gases through the setters. Another advantage of the greater ventilation is that the glaze is brought to fusion and colors are oxidized more evenly throughout the mass of tile being fired, producing more uniform color between tiles of a lot being fired and permitting a better duplication of conditions so that the colors of different lots can be more evenly matched.

It is also apparent from this construction that no labor is lost in cementing setter trays together and, because all setters may be of equal height, one layer of setters in a kiln car will provide a level, stable surface for a succeeding layer, enabling cars to be loaded more quickly.

This invention is not to be considered limited to the specific illustrative embodiment disclosed but may be modified to meet the requirements of specific tiles, kilns, and loading techniques and requirements. Accordingly, those skilled in the art may vary this invention within the scope of the appended claims without departing from the spirit and purpose thereof.

What is claimed is:

1. A tile setter for firing ceramic tile comprised of opposed side walls joined at their top and bottom to define a cell, a plurality of cantilever shelves carried by each side wall, said shelves being inclined upwardly with respect to the wall supporting them, and shelves carried by said opposite walls being arranged in pairs to provide pairs of tile supporting edges, the two edges in any one pair being equidistant from the bottoms of the supporting walls and one edge in such pair being spaced from its supporting side wall a distance equal to the distance the other edge in the pair is spaced from its supporting side wall, whereby, when a tile is supported on a pair of said edges, the weight of tile between said edges is substantially counter-balanced by the weight of the portion of said tile extending beyond said edges toward the supporting side walls.

2. A tile setter as defined in claim 1 in which said side walls are spaced from each other a distance to provide clearance for a tile to be supported on the said pairs of shelves and the shelves of said pairs extend toward each other to support said tile on their respective tile-supporting edges providing lines of support located substantially midway between the center of a tile and the edges of said tile adjacent said walls.

3. A tile setter as defined in claim 2 including a bottom member joining adjacent side walls, and a pair of ridges on said bottom member spaced from each other and the side walls as the supporting edges of a pair of shelves are spaced from each other and the side walls.

4. A tile setter as defined in claim 2 which is open at the front and back to permit ventilation of said cell and insertion of tiles into said cell for support on the tile-supporting edges of pairs of said shelves.

5. A tile setter comprising a plurality of cells as defined in claim 1 and joined together by means of a common side wall between cells.

6. A multi-cell tile setter comprising a top member, a bottom member, side walls, and at least one vertical partition forming a cell, as defined in claim 1, between said partition and said side wall.

*7. The method of firing flat green tile to minimize sagging during fire comprising the steps of providing a refractory setter with opposed vertical side walls and at least one open side, said side walls being spaced internally from each other a distance greater than the width of the*

*tile to be fired therein, each of said side walls carrying an internal shelf extending toward an internal shelf carried by the opposed side wall to provide a pair of adjacent substantially parallel and horizontal shelf edges functioning as narrow bearing surfaces for a tile to be fired thereon and said edges being above the upper horizontal surface of their respective shelves and spaced apart a distance equal to substantially one-half the width of tile to be fired in said setter, placing a green flat tile on said edges so that substantially equal margins are supported above each of the shelves in the pair and firing said assembled setter and tile, maintaining said shelf edges substantially horizontal during firing so that the margins of said tile substantially counterbalance the center portions supported between said edges.*

*8. The method as defined in claim 7 including, in the step of providing a setter as defined therein, providing a setter with a plurality of sets of said shelves, the said edges of which are spaced vertically with respect to each other a distance at least twice the thickness of said tiles and in which tiles placed on said shelves are coated on their upper surface with unfired glaze but are substantially free of glaze on their undersurfaces, whereby the underside of a tile stacked in spaced arrangement on a set of said shelves and supported between said edges above another tile serves as a receptor of at least some of the glaze volatilized during the step of firing.*

*9. The method as defined in claim 8, including in the step of providing a setter as defined therein, a setter in which the undersurfaces of said shelves slope upwardly toward its inner edge from a point on its supporting wall sufficient to provide clearance from a tile supported beneath said shelves, whereby glaze which volatilizes from said tiles during firing and condenses on the undersides*

*of said shelves will tend to run toward said walls rather than drop on a tile beneath.*

*10. The method as defined in claim 9, including, in the step of providing a setter as defined therein, providing a settter in which the upper surface of said shelves, in their areas intended to be overhung by said tiles, are at no point vertically above their respective edges but are closely adjacent the planes defined by the respective opposed and parallel horizontal edges, whereby the upper surfaces of said shelves serve as limits for the sagging of the margins of said tiles during the step of firing.*

*11. The method as defined in claim 10, including, in the step of providing a setter therein, providing a setter with opposed open sides, and ventilating through said open sides during the step of firing.*

References Cited

The following references, cited by the Examiner, are of record in the patented file of this patent or the original patent.

UNITED STATES PATENTS

| | | | |
|---|---|---|---|
| 1,848,200 | 3/1932 | Robinson | 25—153 |
| 1,860,374 | 5/1932 | Vincent | 25—153 |
| 1,885,691 | 11/1932 | Dressler | 25—153 |
| 2,567,609 | 9/1951 | Lovatt | 25—153 |
| 2,602,984 | 7/1952 | Owen | 25—153 |

OTHER REFERENCES

G. Klein: Experience With Open Setting of Glost Wall Tile in Funnel Kilns, in Jour. Amer. Cer. Soc. 38(5), pp. 403–412, May 1931 (pages 406–407 relied upon), TP 785 A 62.

WILLIAM J. STEPHENSON, *Primary Examiner.*